(12) United States Patent  
Giuntini et al.

(10) Patent No.: US 9,857,812 B2
(45) Date of Patent: Jan. 2, 2018

(54) SYSTEMS AND METHODS FOR ADVANCED DIAGNOSTIC IN MODULAR POWER CONVERTERS

(71) Applicant: General Electric Company, Schenectady, NY (US)

(72) Inventors: Lorenzo Giuntini, Riazzino (CH); Andrea Lauro Delmue', Bellinzona (CH); Andrea Mannuccini, Locarno (CH); Luigi De Bernardi, Cernobbio (IT); Giosue' Claudio Rebuffoni, Sulbiate (IT)

(73) Assignee: General Electric Company, Schenectady, NY (US)

( * ) Notice: Subject to any disclaimer, the term of this patent is extended or adjusted under 35 U.S.C. 154(b) by 505 days.

(21) Appl. No.: 14/556,519

(22) Filed: Dec. 1, 2014

(65) Prior Publication Data
US 2016/0033978 A1 Feb. 4, 2016

Related U.S. Application Data

(60) Provisional application No. 62/031,913, filed on Aug. 1, 2014.

(51) Int. Cl.
*G05F 1/00* (2006.01)
*H02M 7/493* (2007.01)
(Continued)

(52) U.S. Cl.
CPC ............... *G05F 1/10* (2013.01); *H02J 4/00* (2013.01); *H02M 3/1584* (2013.01); *H02M 7/493* (2013.01); *H02M 7/487* (2013.01)

(58) Field of Classification Search
CPC .... H02M 7/493; H02M 7/487; H02M 3/1584; G05F 1/44; G05F 1/10; H02J 7/062; H02J 7/06; H02J 2009/063
See application file for complete search history.

(56) References Cited

U.S. PATENT DOCUMENTS 4,276,590 A 6/1981 Hansel et al.
4,924,170 A 5/1990 Henze
(Continued)

FOREIGN PATENT DOCUMENTS

EP 0813292 A2 12/1997
EP 1061629 A1 12/2000
(Continued)

OTHER PUBLICATIONS

Jordan, "UC3907 Load Share IC Simplifies Power Supply Design", Unitrode Application Note, Texas Instruments, 1999.*
(Continued)

*Primary Examiner* — Ryan Johnson
(74) *Attorney, Agent, or Firm* — General Electric Company (57) ABSTRACT

A power conversion system is provided. The power conversion system includes a plurality of power conversion modules connected in parallel, all power conversion modules of the plurality of power conversion modules configured to receive a pulse-width modulation control signal, each power conversion module of the plurality of power conversion modules including a current unbalance detection circuit configured to calculate a difference between a reference current and an output current of the power conversion module, and a processing device communicatively coupled to the current unbalance detection circuit and configured to perform processing using the calculated difference.

18 Claims, 9 Drawing Sheets

(51) Int. Cl.
*H02M 7/487* (2007.01)
*G05F 1/10* (2006.01)
*H02M 3/158* (2006.01)
*H02J 4/00* (2006.01)

(56) References Cited

U.S. PATENT DOCUMENTS

| | | | |
|---|---|---|---|
| 5,036,452 A | 7/1991 | Loftus | |
| 5,164,890 A | 11/1992 | Nakagawa et al. | |
| 5,905,645 A | 5/1999 | Cross | |
| 6,346,798 B1 | 2/2002 | Passoni et al. | |
| 6,642,631 B1 | 11/2003 | Clavette | |
| RE38,454 E | 3/2004 | Walters et al. | |
| 7,170,180 B2 | 1/2007 | Wagoner | |
| 7,323,794 B2 | 1/2008 | Gentillet et al. | |
| 7,724,552 B2* | 5/2010 | Itakura | H02J 1/102 363/65 |
| 7,830,689 B2 | 11/2010 | Nakamura et al. | |
| 8,144,489 B2 | 3/2012 | Dommaschk et al. | |
| 8,536,842 B2* | 9/2013 | Prodi | H02M 3/157 323/272 |
| 8,552,589 B2* | 10/2013 | Ghosh | H02J 9/062 307/64 |
| 2003/0161167 A1 | 8/2003 | Barnett et al. | |
| 2003/0173937 A1 | 9/2003 | Uematsu et al. | |
| 2009/0009005 A1* | 1/2009 | Luo | H02M 7/493 307/82 |
| 2011/0199033 A1 | 8/2011 | Abolhassani et al. | |
| 2012/0262141 A1 | 10/2012 | Heineman et al. | |
| 2012/0320640 A1 | 12/2012 | Baurle et al. | |

FOREIGN PATENT DOCUMENTS

| | | |
|---|---|---|
| EP | 1850469 A1 | 10/2007 |
| JP | 5112111 B2 | 1/2013 |
| WO | 2014006200 A1 | 1/2014 |

OTHER PUBLICATIONS

European Search Report and Opinion issued in connection with corresponding EP Application No. 15177664.8 dated Dec. 23, 2015.

Cousineau, M. et al., "Fully Masterless Control of Parallel Converter", Power Electronics and Applications (EPE), 2013 15th European Conference on Sep. 2-6, 2013; pp. 1-10.

Lobsiger, Y. et al., "Decentralized Active Gate Control for Current Balancing of Parallel Connected IGBT Modules", Power Electronics and Applications (EPE 2011), Proceedings of the 2011-14th European Conference on Aug. 30, 2011-Sep. 1, 2011, pp. 1-10.

* cited by examiner

SYSTEMS AND METHODS FOR ADVANCED DIAGNOSTIC IN MODULAR POWER CONVERTERS

CROSS REFERENCE TO RELATED APPLICATIONS

This application is a non-provisional application and claims priority to U.S. Provisional Patent Application Ser. No. 62/031,913 filed Aug. 1, 2014 for "SYSTEMS AND METHODS FOR ADVANCED DIAGNOSTIC IN MODULAR POWER CONVERTERS", which is hereby incorporated by reference in its entirety.

BACKGROUND

The field of the invention relates generally to advanced diagnostics in modular power converters, and more particularly, to current unbalance detection in modular power converters.

Figure 1:
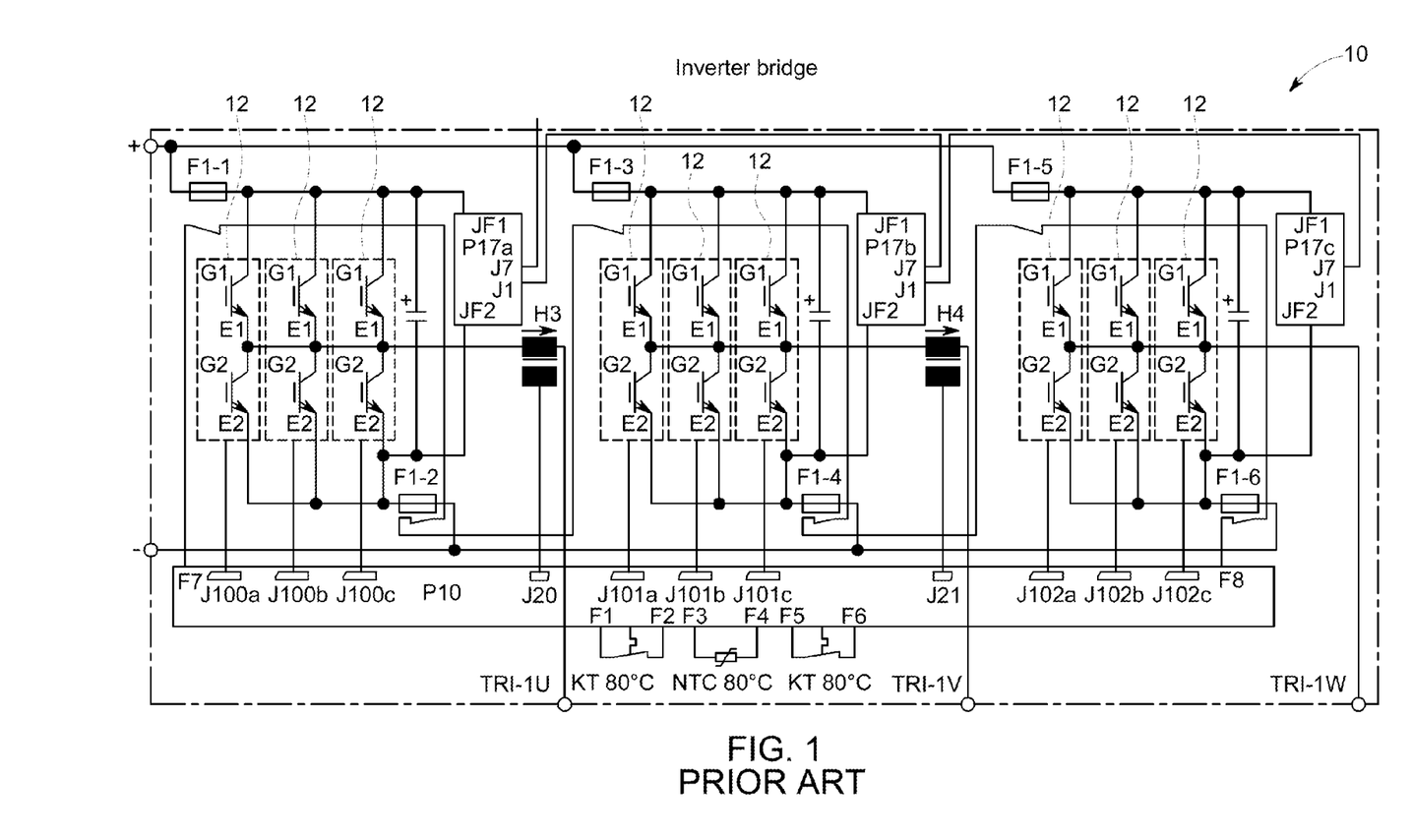
FIG. 1 is a circuit diagram of a known power conversion system.

In at least some known power conversion systems, it is relatively common to increase the power rating of a converter by replicating (i.e., paralleling) a conversion circuit. One implementation of this technique is the straight paralleling of power semiconductors, as shown in FIG. 1. Specifically, a known power conversion system 10 includes, for each of three phases, three insulated gate bipolar transistor (IGBT) power converters 12 coupled in parallel. In such a configuration, all paralleled power converters 12 share the same pulse-width modulation (PWM) (i.e., they receive the same PWM control signals), and load sharing is assumed, given characteristics of power converters 12 and geometry of power conversion system 10.

Figure 2:
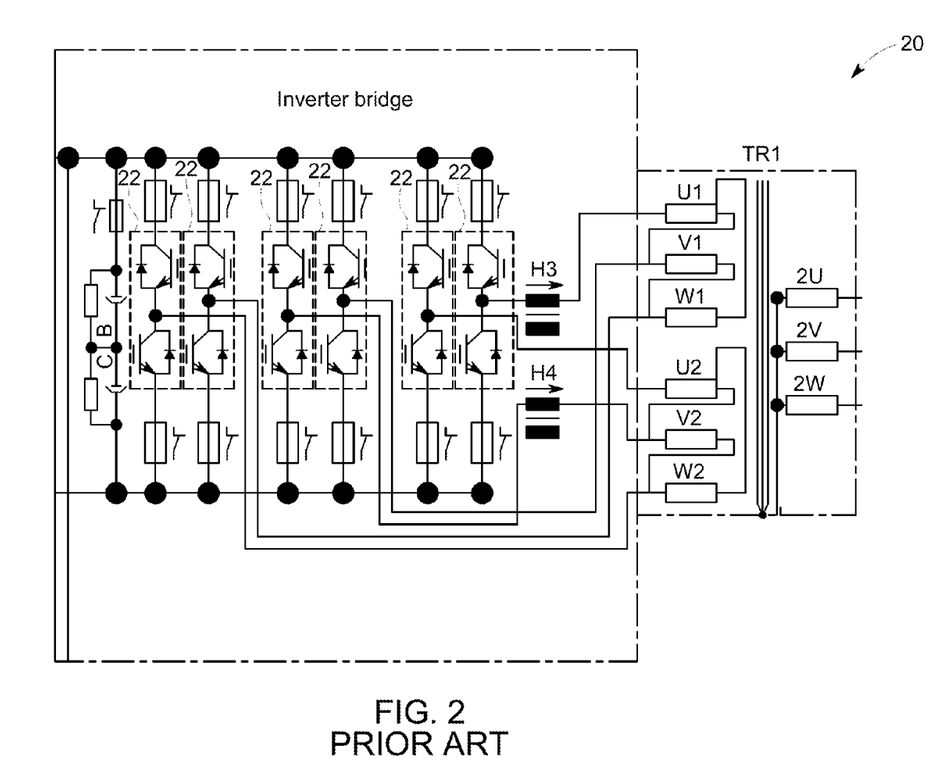
FIG. 2 is a circuit diagram of a known power conversion system.

Another option for paralleling a conversion circuit is paralleling of converter legs through separate transformer primary windings (or through separate inductors in transformer-less implementation), as shown in FIG. 2. Specifically, a known power conversion system 20 includes, for each of three phases (i.e., U, V, W), a pair of power converters 22 coupled in parallel. In this configuration, all parallel power converters 22 also share the same PWM modulation. Introducing an impedance between paralleled power converters 22 facilitates mitigating potential unbalance due to differences in semiconductor characteristics and/or geometry of system 20. However, in the implementations of systems 10 and 20, current sharing is assumed but is not actively monitored. Accordingly, a load unbalance condition may go undetected, which may lead to premature failure of over-stressed modules.

Figure 3:
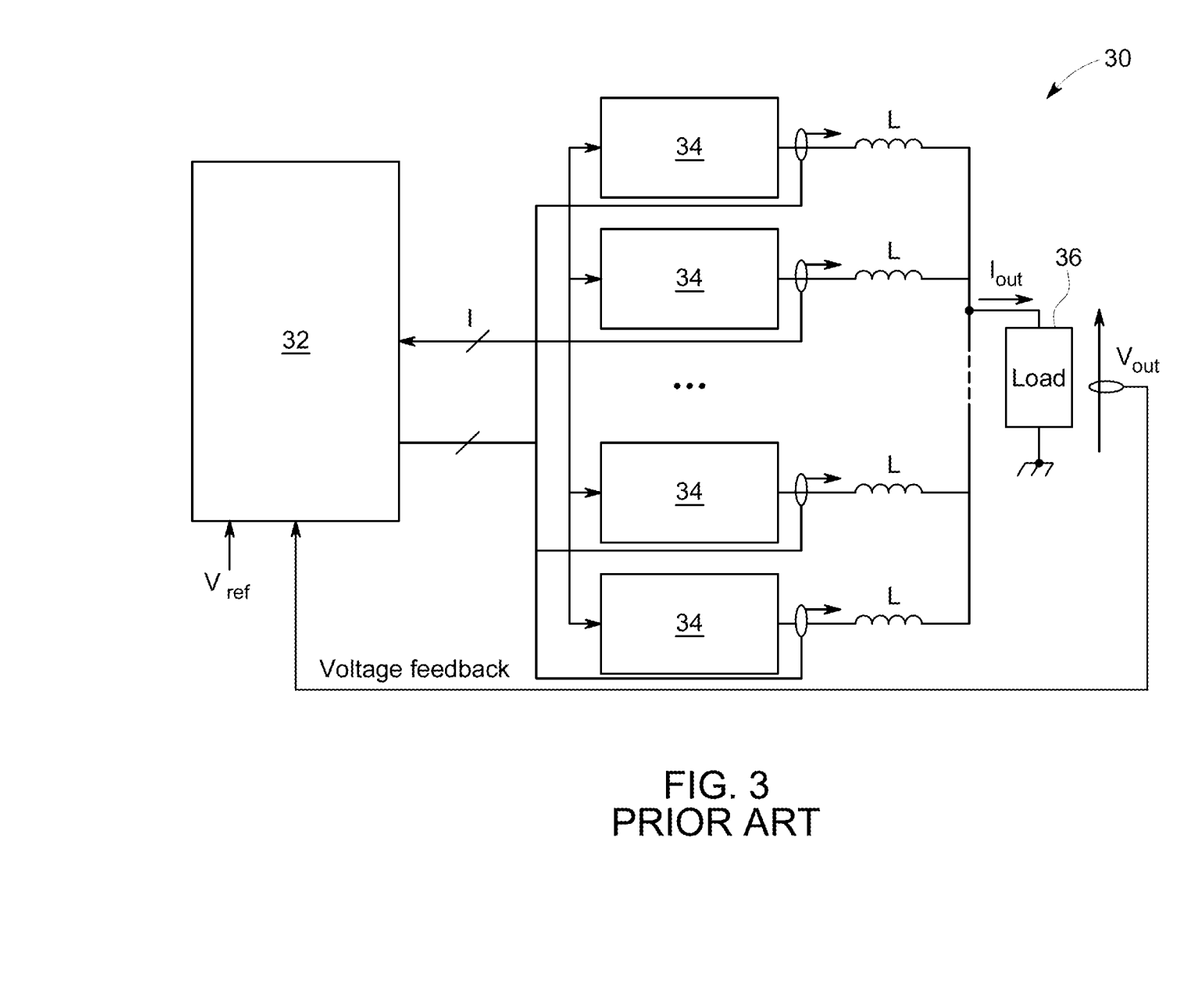
FIG. 3 is a circuit diagram of a known power conversion system.
Figure 4:
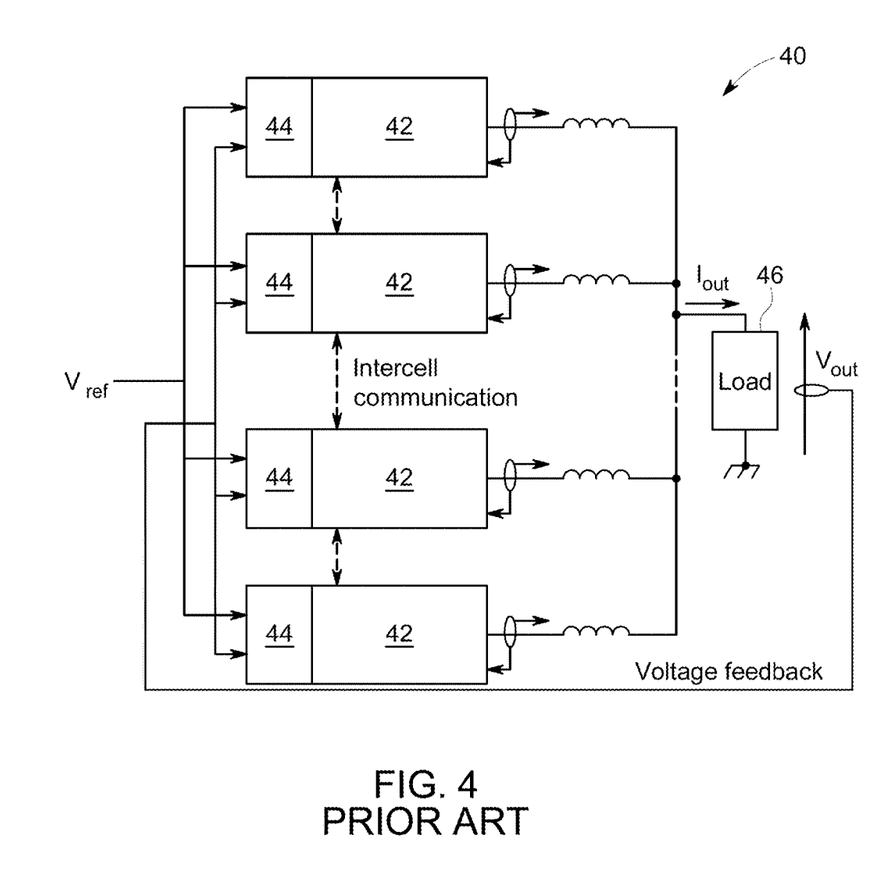
FIG. 4 is a circuit diagram of a known power conversion system.

One alternative approach is the active control of load sharing, by sensing the current in each converter leg, as shown in FIGS. 3 and 4. FIG. 3 shows a known power conversion system 30 that includes a centralized controller 32 communicatively coupled to a plurality of power conversion modules 34. Centralized controller 32 monitors an output current of each power conversion module 34, as well as a voltage across a load 36, and controls operation of power conversion modules 34 accordingly. FIG. 4 shows a known power conversion system 40 that includes a plurality of power conversion modules 42 each including an associated control module 44. Each control module 44 monitors an output current of an associated power conversion module 42, as well as a voltage across a load 46, and controls operation of the associated power conversion modules 42 accordingly. However, such systems may require complex cabling in case of a centralized solution (i.e., system 30), or distributed intelligence in case of decentralized solutions (i.e., system 40).

BRIEF DESCRIPTION

In one aspect, a power conversion system is provided. The power conversion system includes a plurality of power conversion modules connected in parallel, wherein all power conversion modules of the plurality of power conversion modules are configured to receive a pulse-width modulation control signal, each power conversion module of the plurality of power conversion modules including a current unbalance detection circuit configured to calculate a difference between a reference current and an output current of the power conversion module, and a processing device communicatively coupled to the current unbalance detection circuit and configured to perform processing using the calculated difference.

In another aspect, a power conversion module is provided. The power conversion module includes a current unbalance detection circuit configured to calculate a difference between a reference current and an output current of the power conversion module, wherein the reference current is determined based at least in part on an output current of an additional power conversion module, and a processing device communicatively coupled to the current unbalance detection circuit.

In yet another aspect, a method for operating a power conversion system is provided. The method includes coupling a plurality of power conversion modules in parallel, wherein all power conversion modules of the plurality of power conversion modules are configured to receive a pulse-width modulation control signal, and calculating, at each power conversion module of the plurality of power conversion modules, a difference between a reference current and an output current of the power conversion module.

DETAILED DESCRIPTION

The systems and methods described herein relate to advanced diagnostics in modular power converters. Specifically, the embodiments described herein build upon a relatively simple modular implementation, where converter modules are paralleled by series impedance while sharing the same PWM modulation (i.e., they receive the same PWM control signal). By introducing relatively low-cost local programmable devices at the module level, the systems and methods described herein introduce current unbalance detection in a single-wire implementation, thereby preserving the simplicity of the implementation. When a current unbalance is detected, the systems and methods described herein facilitate alerting a user and permitting investigation and maintenance to prevent module failure.

The embodiments described herein enhance a relatively simple modular implementation (i.e., converter paralleling by series impedance, all modules sharing the same PWM modulation) by introducing current sensing for each converter module, with distributed hardware (HW) detection of current unbalance deployed at the inverter leg level. In the exemplary embodiment, the modules share a single wire, reducing cabling complexity as compared to at least some known power conversion systems.

Figure 5:
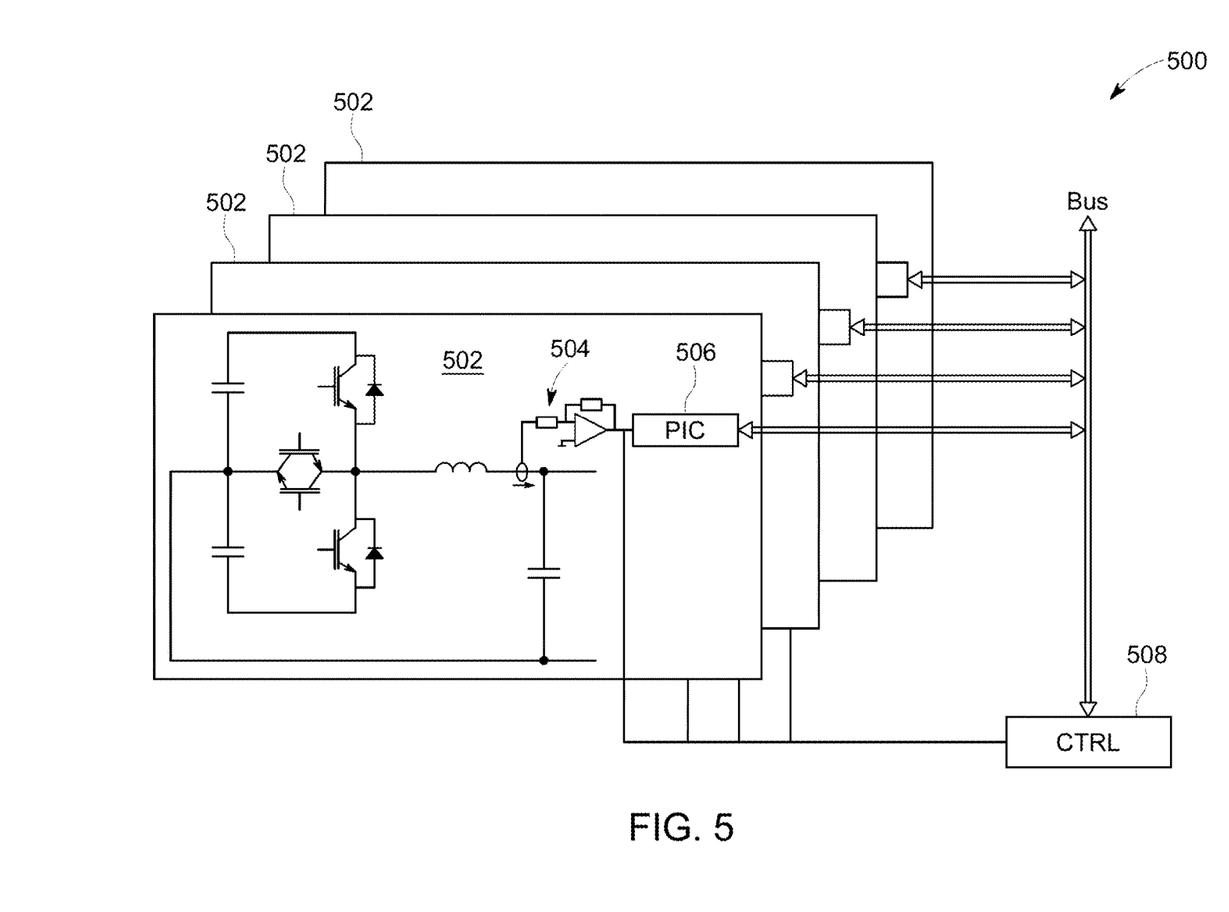
FIG. 5 is a diagram of an exemplary power conversion system.

FIG. 5 is a schematic diagram of an exemplary power conversion system 500. System 500 includes a plurality of power conversion modules 502 coupled in parallel by series impedance. Each power conversion module 502 includes a current unbalance detection circuit 504 and a peripheral interface controller (PIC) 506 (or other suitable processing device) that facilitate detecting a current unbalance in power conversion module 502, as described herein. System 500 also includes a main control logic 508 (i.e., a controller), as described herein. Power conversion modules 502 may be alternating current (AC) to direct current (DC) converters, DC to AC converters, or DC to DC converters.

Figure 6:
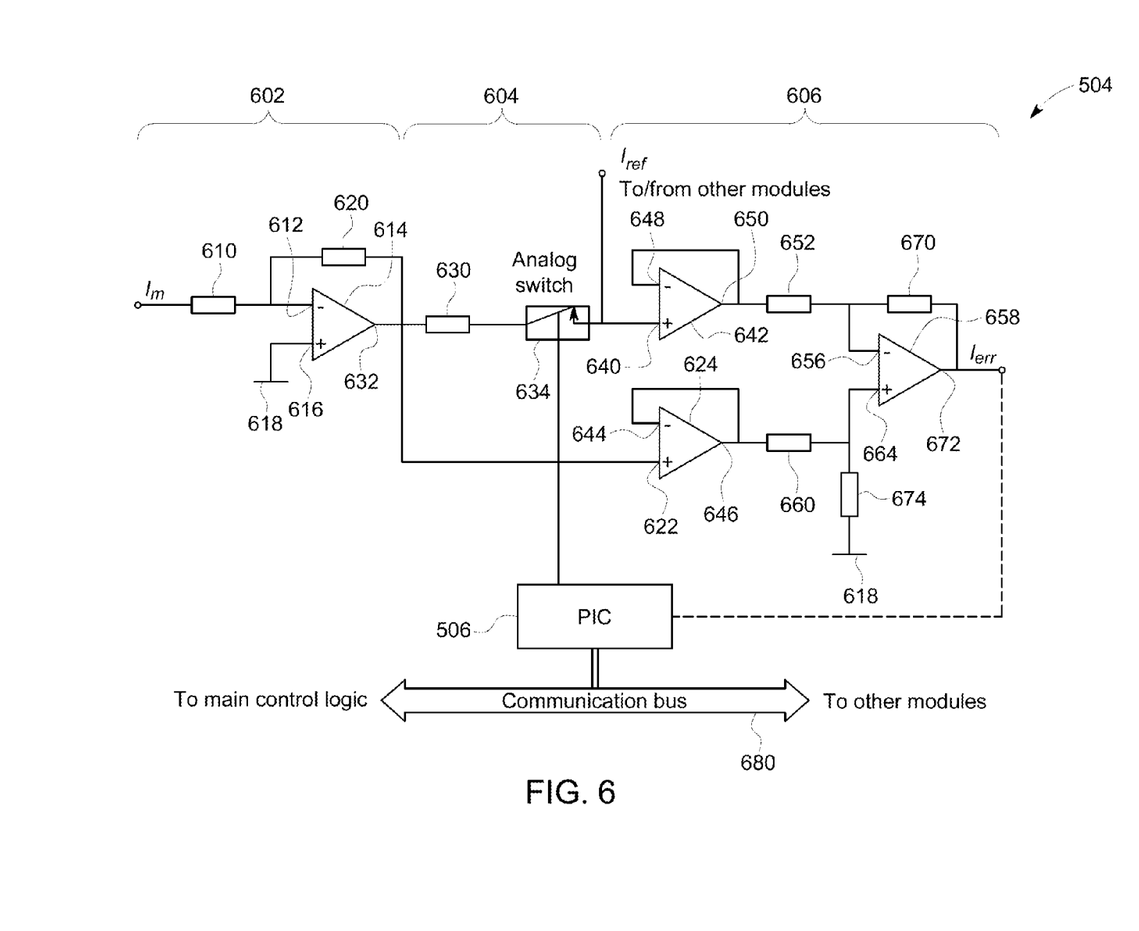
FIG. 6 is a circuit diagram of an exemplary circuit and processing device for detecting current unbalance in a power converter that may be used with the system shown in FIG. 5.

FIG. 6 is a circuit diagram of a current unbalance detection circuit 504 and a peripheral interface controller (PIC) 506 of a power conversion module 502 that may be used with power conversion system 500. As shown in FIG. 6, current unbalance detection circuit 504 includes a conditioning stage 602, an averaging stage 604, and a difference stage 606. The arrangement of components in current unbalance detection circuit 504 is merely exemplary. Accordingly, in other embodiments, current unbalance detection circuit 504 may have any components and/or configuration that enables current unbalance detection circuit 504 to function as described herein.

In the exemplary embodiment, conditioning stage 602 receives a module output current, $I_m$. Specifically, the module output current $I_m$ is channeled through a first resistor 610 that is electrically coupled to a negative input 612 of a first amplifier 614. A positive input 616 of first amplifier 614 is electrically coupled to ground 618. Conditioning stage 602 further includes a second resistor 620 coupled to an output 632 of first amplifier 614, and from there, to a positive input 622 of a second amplifier 624. Conditioning stage 602 facilitates conditioning the module output current $I_m$ for use by averaging stage 604 and difference stage 606. For example, conditioning stage 602 may convert a current signal (such as that from a current transformer) into a voltage signal, scale the voltage signal to a desired range that is manageable by an amplifier circuit and/or acquired through A/D channels, and/or introduce filtering to mitigate noise captured by the current transducer.

Averaging stage 604 includes a third resistor 630 electrically coupled between output 632 of first amplifier 614 and an analog switch 634. Analog switch 634 selectively controls whether third resistor 630 is electrically coupled to a positive input 640 of a third amplifier 642. In the exemplary embodiment, PIC 506 controls whether analog switch 634 is open or closed. Downstream from analog switch 634, averaging stage 604 receives a reference current, $I_{ref}$, from other power conversion modules 502 or provides the reference current $I_{ref}$ to other power conversion modules 502, as described herein.

Difference stage 606 includes second amplifier 624 and third amplifier 642. In the exemplary embodiment, a negative input 644 of second amplifier 624 is electrically coupled to an output 646 of second amplifier 624, and a negative input 648 of third amplifier 642 is electrically coupled to an output 650 of third amplifier 642. A fourth resistor 652 is electrically coupled between output 650 of third amplifier 642 and a negative input 656 of a fourth amplifier 658, and a fifth resistor 660 is electrically coupled between output 646 of second amplifier 624 and a positive input 664 of fourth amplifier 658. Further, a sixth resistor 670 is electrically coupled between negative input 656 of fourth amplifier 658 and an output 672 of fourth amplifier 658, and a seventh resistor 674 is electrically coupled between positive input 664 of fourth amplifier 658 and ground 618.

Operation of current unbalance detection circuit 504 will now be described. As discussed above, system 500 includes a plurality of power conversion modules 502. When analog switches 634 for all power conversion modules 502 are closed, current unbalance detection circuit 504 for a particular module 502 computes an average of the module output currents $I_m$ as the reference current $I_{ref}$, and computes a difference (i.e., $I_{err}$) between the average and the module output current $I_m$ for the particular module 502. When analog switch 634 is closed for only one module 502, the reference current $I_{ref}$ is the module output current $I_m$ for the one module, and current unbalance detection circuit 504 for a particular module 502 computes a difference (i.e., $I_{err}$) between the reference current $I_{ref}$ and the module output current $I_m$ for the particular module 502. Alternatively, any combination of analog switches 634 may be selectively closed to generate different reference currents $I_{ref}$.

Analog switches 634 are controlled by PIC 506, which is in turn controlled by main control logic 508 (shown in FIG. 5) in the exemplary embodiment. Specifically, each PIC 506 is communicatively coupled to main control logic 508 and PICs 506 of other power conversion modules 502 via a communication bus 680. Communication bus 680 may be, for example, a controller area network (CAN).

Figure 7:
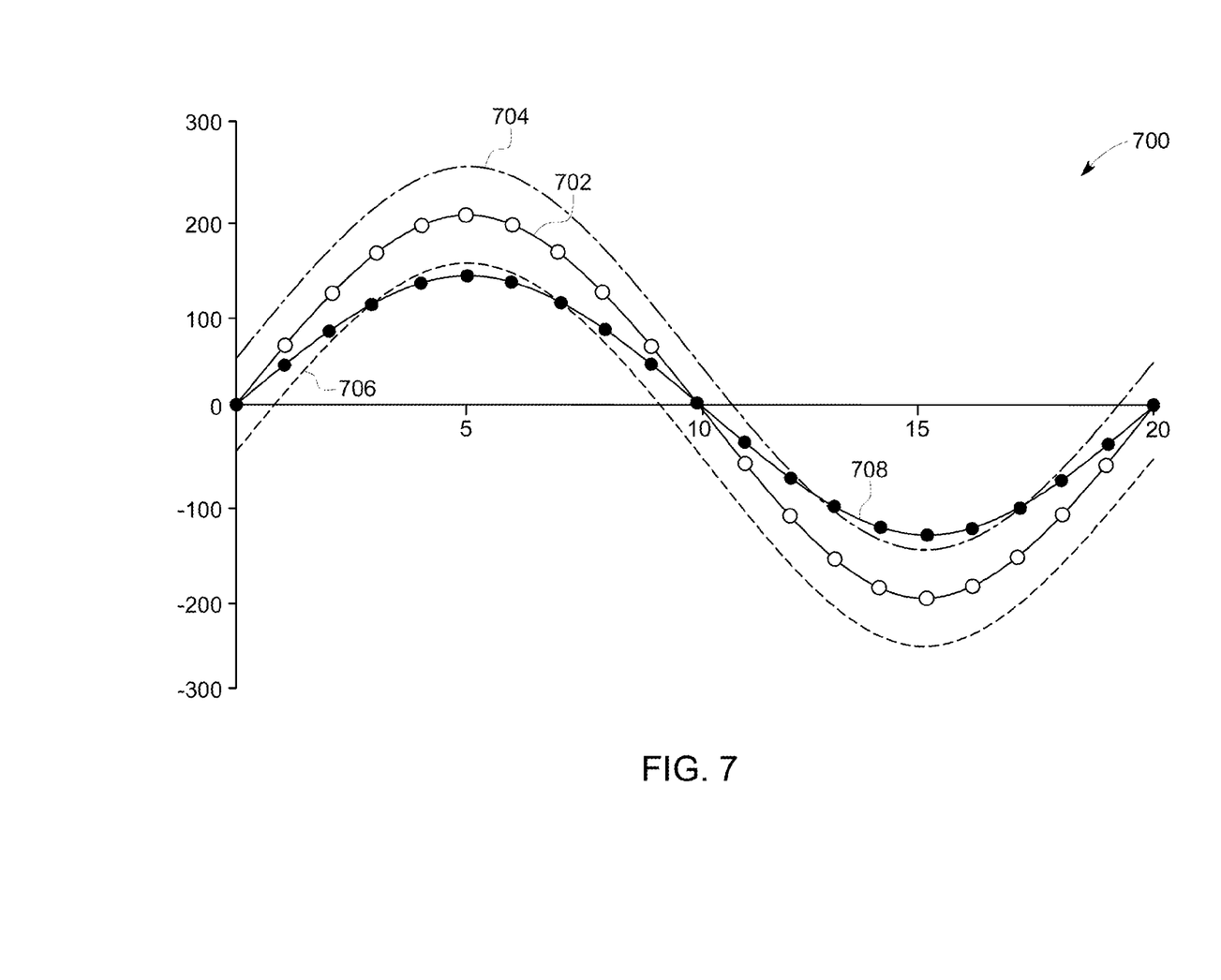
FIG. 7 is a graph illustrating current unbalance detection using the circuit shown in FIG. 6.

The computed difference, $I_{err}$, may be output to PIC 506 for further processing. For example, in the exemplary embodiment, PIC 506 compares the computed difference to a predetermined threshold, and calculates a percentage of time (e.g., of a duty cycle) during which the computed difference exceeds the predefined threshold. FIG. 7 is a graph 700 illustrating this comparison over a sample period at 50 Hz. A central sinewave 702 represents the reference current signals which may be represented as $A \sin(\omega t)$. A currently unbalance threshold, $A_T$, can then be defined, resulting in two curves 704 and 706 corresponding to $A \sin(\omega t) \pm A_T$. An additional sinewave 708 is the module current, and can be represented as $B \sin(\omega t)$. When sinewave 708 falls outside of the tolerance band $\pm A_T$ (i.e., the area between curves 704 and 706), the difference between sinewave 702 and sinewave 708 exceeds the unbalance threshold $A_T$. Therefore, the module current signal may be compared against such tolerance limits, or the difference between the reference and module currents may be compared against the tolerance limits. The result of this comparison is communicated to main control logic 508.

Based on the received result, main control logic 508 detects whether or not a current unbalance condition is occurring. For example, consider the two signals for comparison to be two sinewaves that are synchronous and in phase. Specifically, the first signal may be represented as A sin(ωt) and the second signal may be represented as B sin(ωt). The difference between the two, (A-B)sin(ωt) would also be a sinewave, D sin(ωt), where D=A−B.

This resulting sinewave can be expressed in terms of percent variation with respect to amplitude, as $AD_{\%}$ sin(ωt), wherein $D_{\%}$=(A−B)/A. Further, this would reach a threshold, $A_T$, at an angle φ. That is, $AD_{\%}$ sin(φt)=$A_T$. Then, the fraction of all samples that would activate the detection is given by 1−(2φ/π). Therefore, the duty cycle of the binary signal capturing when the difference between the two signals exceeds the threshold can be related to their absolute difference. That is, the duty cycle facilitates capturing a situation where a percent variation exceeds a certain threshold, allowing activation of unbalance detection based on the difference exceeding a predetermined percentage.

When a current unbalance condition is detected, main control logic 508 may trigger an alarm and/or take appropriate action (e.g., de-rating the power conversion module 502 in which the current unbalance condition occurs). From a technical perspective, the embodiments described herein are relatively simple and cost-effective, as they utilize low-performing distributed programmable logic in PICs 506. Although each power conversion module 502 includes a current unbalance detection circuit 504, these are only connected locally and do not contribute to cabling complexity of the overall system 500.

The embodiments described herein also facilitate improving system reliability by providing a detection of a current unbalance condition. This translates into a commercial advantage over at least some known power conversion systems, as it yields a smarter and more reliable system. Additionally, following the flexibility of detection, this feature is helpful during production testing to assess current unbalance in newly produced units. At the same time, it also facilitates troubleshooting and commissioning field units (i.e., assessing current unbalance in field installations).

In the same context, the availability of local module intelligence (i.e., PICs 506) communicating with main control logic 508 offers additional diagnostic possibilities, such driving a single power conversion module 502 at a time. That is, the main control logic 508 may select a specific power conversion module 502 to be actively driven (and with current sensing enabled through current unbalance detection circuit 504) while other power conversion modules 502 are maintained in an OFF state. This allows isolating a failed module during troubleshooting. Further, on some embodiments, even sub-sections within a particular power conversion module 502 may be selectively activated and/or deactivated. For example, in a multi-phase converter, each converter leg/phase may be activated separately for additional flexibility during troubleshooting.

Figure 8:
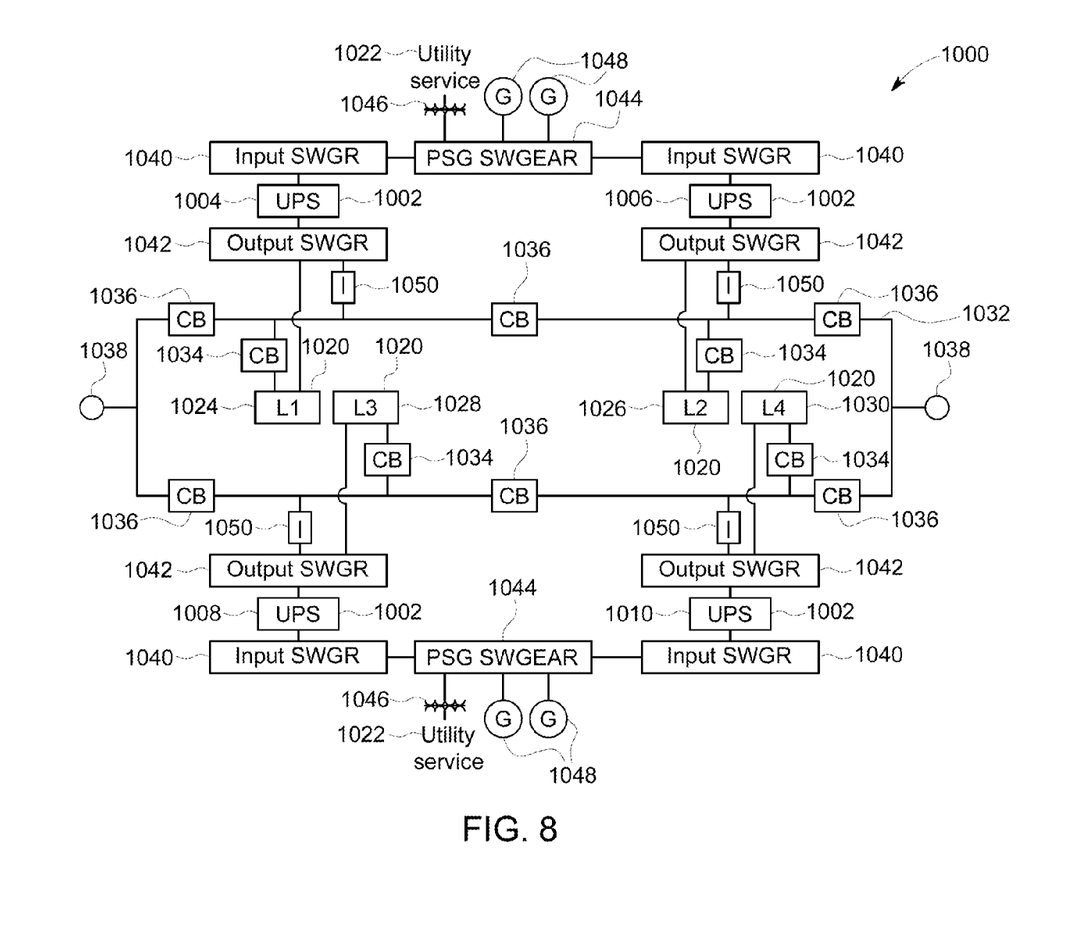
FIG. 8 is a schematic diagram of an exemplary power supply system that may be used with the circuit and processing device shown in FIG. 6.

The systems and methods described herein may be implemented in an uninterruptible power supply (UPS) system. For example, FIG. 8 is a schematic diagram of an exemplary redundant isolated-parallel (IP) uninterruptible power supply (UPS) system 1000. In the exemplary embodiment, system 1000 includes a plurality of UPSs 1002 arranged in a ring architecture, or parallel architecture, as described herein. Specifically, system 1000 includes a first UPS 1004, a second UPS 1006, a third UPS 1008, and a fourth UPS 1010 in the exemplary embodiment. Alternatively, system 1000 may include any number of UPSs 1002 that enable system 1000 to function as described herein. In the exemplary embodiment, system 1000 is a three wire system.

Alternatively, system 1000 may be a four wire system (i.e., a system including a neutral wire to each load). UPSs 1002 may be implemented using system 500 and power conversion modules 502 (both shown in FIG. 5).

In the exemplary embodiment, UPSs 1002 are static double conversion UPSs (i.e., true on-line system systems). Both static and rotary UPSs may require droop control techniques for both voltage and frequency. In some cases, droop control for frequency alone may be sufficient. In some embodiments, droop control techniques are adapted depending on whether a load is linear or non-linear.

System 1000 facilitates providing power to one or more loads 1020. Under normal operation, one or more utilities 1022 function as a power source and provide power to loads 1020. Utilities 1022 may provide alternating current (AC) or direct current (DC) power to system 1000. In the event that power from utilities 1022 fails to reach loads 1020 (e.g., due to a failure of utility 1022 and/or devices between utility 1022 and loads 1020), system 1000 utilizes UPSs 1002 to keep power flowing to loads 1020, as described herein. In the exemplary embodiment, system 1000 includes a first load 1024, a second load 1026, a third load 1028, and a fourth load 1030. Alternatively, system 1000 may include any number of loads 1020 that enable system 1000 to function as described herein.

Each load 1020 is electrically coupled between an associated UPS 1002 and a ring bus 1032. Specifically, in the exemplary embodiment, each load 1020 is coupled to ring bus 1032 via an associated load circuit breaker 1034. Further, ring bus 1032 includes a plurality of ring bus circuit breakers 1036. In the event that any segment of ring bus 1032 fails or is shut down, the architecture of system 1000 ensures that power is still able to reach loads 1020. Notably, the architecture shown in FIG. 8 is merely exemplary. For example, in some embodiments, loads 1020 may be coupled directly to ring bus 1032 or may be coupled between UPSs 1002. Further, system 1000 may include additional UPSs 1038 coupled directly to ring bus 1032.

In the exemplary embodiment, each UPS 1002 is electrically coupled between an input switchgear 1040 and an output switchgear 1042. Input switchgears 1040 are electrically coupled to paralleling switchgears 1044, which are in turn electrically coupled to utility 1022 through an associated transformer 1046. In the exemplary embodiment, each paralleling switchgear 1044 is also electrically coupled to one or more grounds 1048. Switchgears 1040, 1042, and 1044 include may include local circuits, remote synchronization circuits, and/or software to facilitate attenuating disturbances, interference, and/or crosstalk on ring bus 1032 to provide clean power to loads 1020. In the exemplary embodiment, each output switchgear 1042 is electrically coupled directly to an associated load 1020, and coupled to ring bus 1032 through an associated choke 1050 (e.g., an inductor).

In system 1000, without proper synchronization, UPSs 1002 may interfere with one another and/or start to override one another, causing oscillations or other undesirable effects. Accordingly, in the exemplary embodiment, a controller (not shown in FIG. 8) controls operation of UPSs 1002. More specifically, the controller controls a frequency of an output voltage of each UPS 1002, as described herein. The frequency for each UPS 1002 is calculated as a function of power, as described herein.

Figure 9:
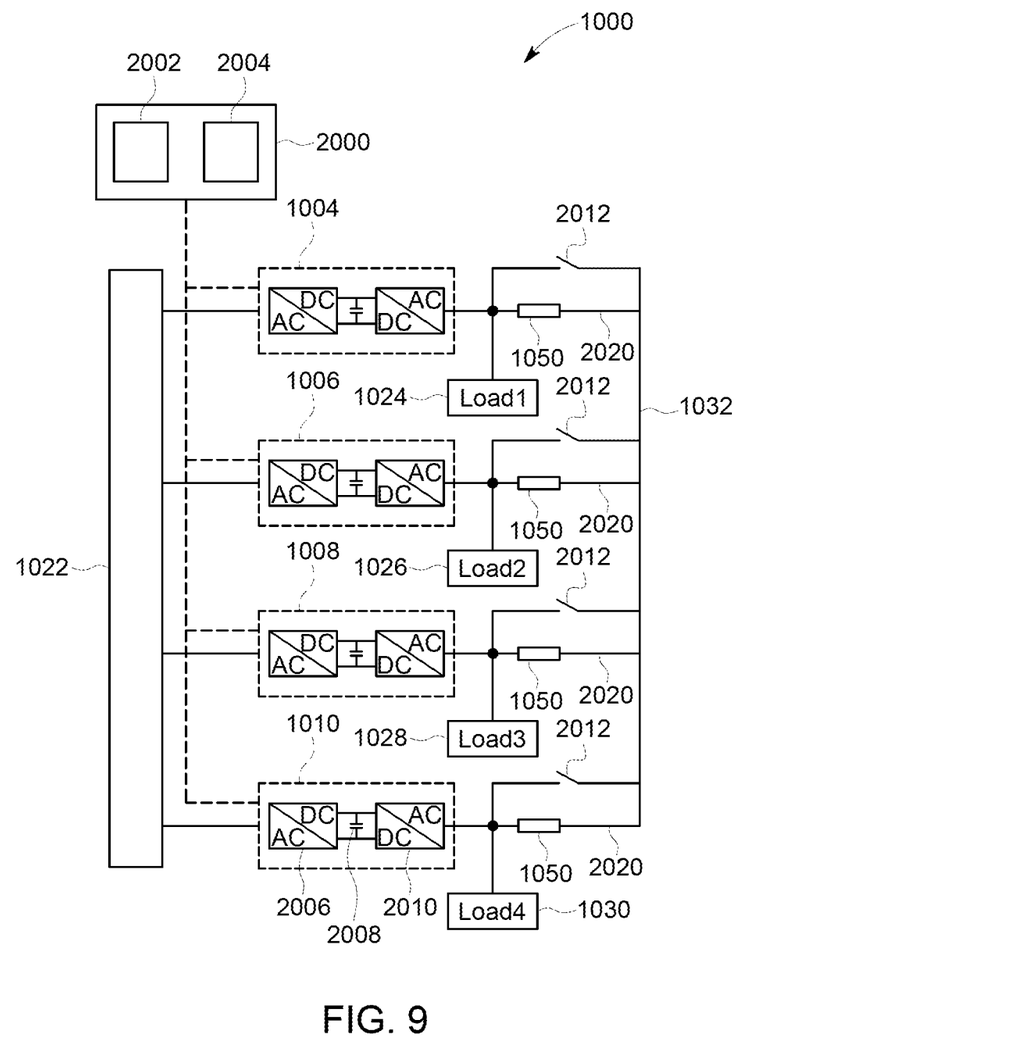
FIG. 9 is a simplified diagram of the system shown in FIG. 8.

FIG. 9 is a simplified diagram of system 1000. As shown in FIG. 9, a controller 2000 is communicatively coupled to each of first UPS 1004, second UPS 1006, third UPS 1008, and fourth UPS 1010. Although a single controller 2000 is shown in FIG. 9, alternatively, a separate controller may control the operation of each UPS 1002. Controller 2000 may include its own power system (not shown) such as a dedicated energy source (e.g., a battery). In some embodiments, controller 2000 is coupled to a substitute controller (not shown) that may be used in the event that controller 2000 fails. Controller 2000 may control power distribution and management of system 1000 over a relatively large geographic area.

In the exemplary embodiment, controller 2000 is implemented by a processor 2002 communicatively coupled to a memory device 2004 for executing instructions. In some embodiments, executable instructions are stored in memory device 2004. Alternatively, controller 2000 may be implemented using any circuitry that enables controller 2000 to control operation of UPSs 1002 as described herein. For example, in some embodiments, controller 2000 may include a state machine that learns or is pre-programmed to determine information relevant to which loads 1020 require power. For example, controller 2000 may dynamically determine what power resources will be needed and at what performance level and environmental conditions (e.g., temperature, humidity, time of day, etc.) those power resources will need to operate. Controller 2000 may perform dynamic monitoring to determine whether a given load 1020 is satisfied with the power delivered, and whether delivered power is free of harmonics, transients, etc. In some embodiments, dynamic monitoring may include tracking resource usage to determine how much current or voltage should be delivered. Controller 2000 may also monitor and/or control rapidity (i.e., bandwidth) and inverter capability (e.g., overload, reactive power, active power) to facilitate ensuring reliability of system 1000 and minimizing performance degradation of UPSs 1002.

Controller 2000 may also include a state machine scheduler configured to selectively activate and deactivate power resources, set voltage and current levels, and/or take power saving actions (e.g., reducing current delivery). Controller 2000 may also track characteristics (e.g., static allocation of power) of system 1000 to determine whether one or more components of system 1000 should be put on standby or whether power should be diverted.

In the exemplary embodiment, controller 2000 performs one or more operations described herein by programming processor 2002. For example, processor 2002 may be programmed by encoding an operation as one or more executable instructions and by providing the executable instructions in memory device 2004. Processor 2002 may include one or more processing units (e.g., in a multi-core configuration). Further, processor 2002 may be implemented using one or more heterogeneous processor systems in which a main processor is present with secondary processors on a single chip. As another illustrative example, processor 2002 may be a symmetric multi-processor system containing multiple processors of the same type. Further, processor 2002 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 2002 causes controller 2000 to operate UPSs 1002, as described herein.

In the exemplary embodiment, memory device 2004 is one or more devices that enable information such as executable instructions and/or other data to be stored and retrieved. Memory device 2004 may include one or more computer readable media, such as, without limitation, dynamic random access memory (DRAM), static random access memory (SRAM), a solid state disk, and/or a hard disk. Memory device 2004 may be configured to store, without limitation, application source code, application object code, source code portions of interest, object code portions of interest, configuration data, execution events and/or any other type of data. Main controller logic 508 and/or PICs 506 may be similarly implemented using an associated processor and memory device.

As shown in FIG. 9, UPSs 1002 and loads 1020 are electrically coupled to one another through chokes 1050 and ring bus 1032. Further, in the exemplary embodiment, a switch (shown in a closed state in FIG. 9) is coupled between each choke 1050 and ring bus 1032. Each UPS 1002 includes a rectifier 2006, a DC capacitor 2008, and an inverter 2010 in the exemplary embodiment. Further, each load 1020 is electrically coupled in parallel with an output capacitor (not shown), and each UPS 1002 is electrically coupled in series with an inductor (not shown), in the exemplary embodiment. Each inductor and an associated output capacitor form an LC filter, and the phase angle $\delta$ is a phase angle of the output voltage of a UPS 1002 as measured across the output capacitor. Further, a bypass switch 2012 is coupled in parallel with each choke 1050. Closing bypass switch 2012 causes power flow to bypass an associated choke 1050.

Loads 1020 can receive power from a local UPS 1002 (e.g., first load 1024 receiving power from first UPS 1004) and from other UPSs 1002 through choke 1050. Accordingly, in the event that a local UPS 1002 fails, a load 1020 can receive power from other UPSs 1002.

The implementations described herein relate to advanced diagnostics in modular power converters. Specifically, the embodiments described herein build upon a relatively simple modular implementation, where converter modules are paralleled by series impedance while sharing the same PWM modulation. By introducing relatively low-cost local programmable devices at the module level, the systems and methods described herein introduce current unbalance detection in a single-wire implementation, thereby preserving the simplicity of the implementation. When a current unbalance is detected, the systems and methods described herein facilitate alerting a user and permitting investigation and maintenance to prevent module failure.

Exemplary embodiments of systems and methods for advanced diagnostics in modular power converters are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

An exemplary technical effect of the methods and systems described herein includes at least one of: (a) coupling a plurality of power conversion modules in parallel, wherein all power conversion modules of the plurality of power conversion modules are configured to receive a pulse-width modulation control signal, and (b) calculating, at each power conversion module of the plurality of power conversion modules, a difference between a reference current and an output current of the power conversion module.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power conversion system comprising:
   a plurality of power conversion modules connected in parallel, wherein all power conversion modules of said plurality of power conversion modules are configured to receive the same pulse-width modulation control signal, each power conversion module of said plurality of power conversion modules comprising:
      a current unbalance detection circuit configured to calculate a difference between a reference current and an output current of said power conversion module; and
      a processing device communicatively coupled to said current unbalance detection circuit and configured to perform processing using the calculated difference.

2. A power conversion system in accordance with claim 1, wherein the reference current is the output current for one power conversion module of the plurality of power conversion modules.

3. A power conversion system in accordance with claim 1, wherein the reference current is an average of the output currents for all power conversion modules of the plurality of power conversion modules.

4. A power conversion system in accordance with claim 1, wherein said current unbalance detection circuit comprises:
   a conditioning stage configured to condition the output current of said power conversion module;
   an averaging stage configured to calculate the reference current; and
   a difference stage configured to calculate the difference between the reference current and the output current.

5. A power conversion system in accordance with claim 1, wherein said power conversion system is configured for use in an uninterruptible power supply system.

6. A power conversion system in accordance with claim 1, wherein said processing device is configured to:
   compare the calculated difference between the reference current and the output current to a predetermined threshold; and
   calculate a percentage of time during which the calculated difference exceeds the predetermined threshold.

7. A power conversion system in accordance with claim 1, further comprising a main control logic communicatively coupled to said processing devices.

8. A power conversion system in accordance with claim 7, wherein said main control logic is configured to determine whether a current unbalance condition occurs based at in least part on the calculated difference between the reference current and the output current.

9. A power conversion system in accordance with claim 1, further comprising a communication bus communicatively coupled between said processing devices.

10. A power conversion module comprising:
    a current unbalance detection circuit configured to:
       calculate a difference between a reference current and an output current of said power conversion module, wherein the reference current is determined based at least in part on an output current of an additional power conversion module;
       compare the calculated difference between the reference current and the output current to a predetermined threshold; and
       calculate a percentage of time during which said calculated difference exceeds the predetermined threshold; and
    a processing device communicatively coupled to said current unbalance detection circuit and configured to perform processing using the calculated difference.

11. A power conversion module in accordance with claim 10, wherein the reference current is the output current for the additional power conversion module.

12. A power conversion module in accordance with claim 10, wherein the reference current is an average of output currents for a plurality of power conversion modules.

13. A power conversion module in accordance with claim 10, wherein said current unbalance detection circuit comprises:
    a conditioning stage configured to condition the output current of said power conversion module;
    an averaging stage configured to calculate the reference current; and
    a difference stage configured to calculate the difference between the reference current and the output current.

14. A power conversion module in accordance with claim 10, wherein said power conversion module is configured for use in an uninterruptible power supply system.

15. A method for operating a power conversion system, said method comprising:
    coupling a plurality of power conversion modules in parallel, wherein all power conversion modules of the plurality of power conversion modules are configured to receive the same pulse-width modulation control signal; and
    calculating, at each power conversion module of the plurality of power conversion modules, a difference between a reference current and an output current of the power conversion module.

16. A method in accordance with claim 15, wherein the reference current is the output current for one power conversion module of the plurality of power conversion modules.

17. A method in accordance with claim 15, wherein the reference current is an average of the output currents for all power conversion modules of the plurality of power conversion modules.

18. A method in accordance with claim 15, further comprising:
- comparing the calculated difference between the reference current and the output current to a predetermined threshold; and
- calculating a percentage of time during which the calculated difference exceeds the predetermined threshold.

* * * * *